INVENTOR.
BOUDEWIJN BOLLEE

March 18, 1969  B. BOLLEE  3,433,981
ELECTROSTATIC SYNCHRONOUS MOTORS
Filed April 14, 1967  Sheet 3 of 3

INVENTORS
BOUDEWIJN BOLLEE
BY
AGENT

United States Patent Office 3,433,981
Patented Mar. 18, 1969

3,433,981
ELECTROSTATIC SYNCHRONOUS MOTORS
Boudewijn Bollee, Emmasingel, Eindhoven, Netherlands, assignor to North American Philips Company, Inc., New York, N.Y., a corporation of Delaware
Filed Apr. 14, 1967, Ser. No. 630,996
Claims priority, application Netherlands, Apr. 27, 1966, 6605612
U.S. Cl. 310—6                                                                                11 Claims
Int. Cl. H02n 1/00

ABSTRACT OF THE DISCLOSURE

An electrostatic synchronous motor wherein the rotor and stator include a plurality of axially extending tooth-shaped electrodes positioned in concentric circular rows. The rows of electrodes of the rotor are rotatably interposed with the rows of stator electrodes and positioned in close proximity thereto. The width and location of the electrodes are fixed according to predetermined relationships.

---

Figure 1:
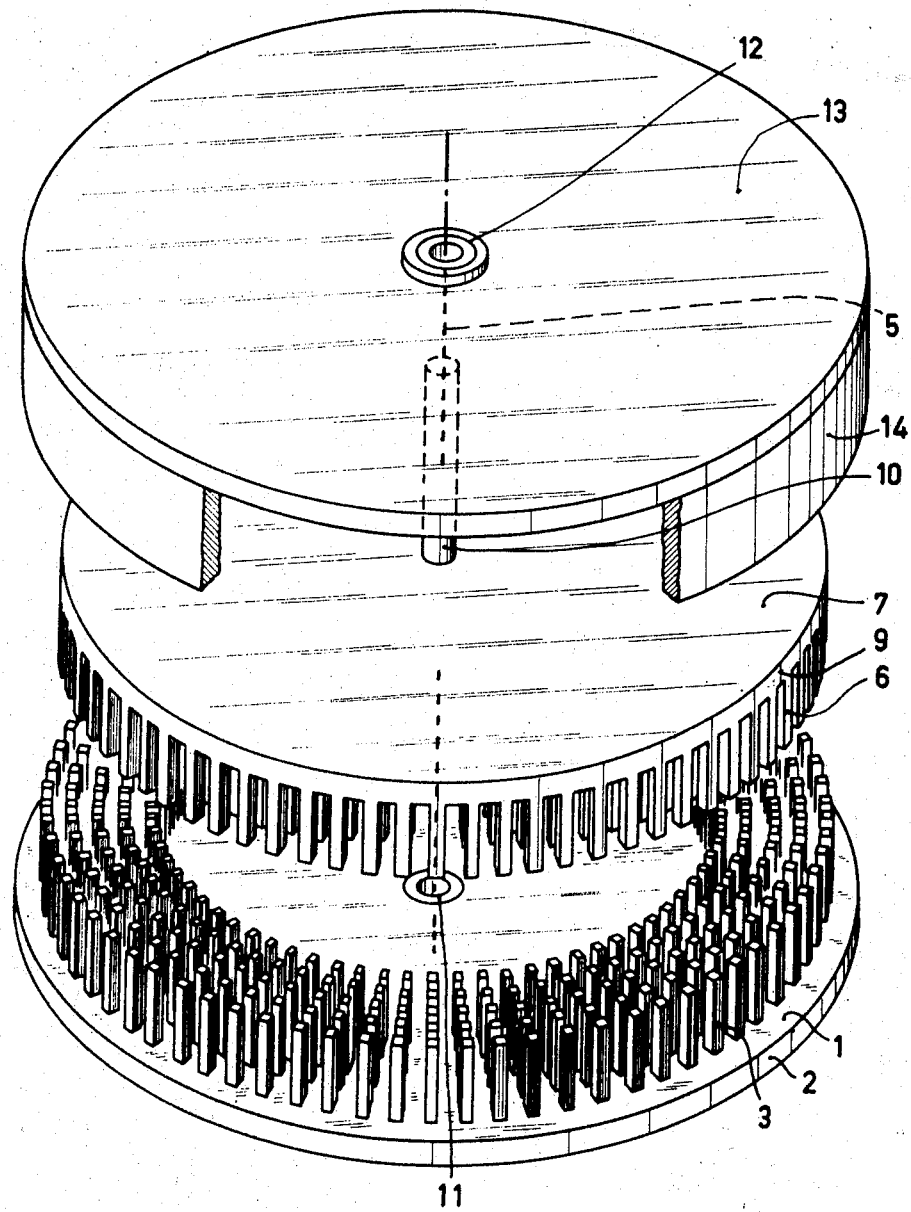

The invention relates to an electrostatic synchronous motor in which electrodes of a stator cooperate with electrodes of a rotor which is electrically insulated from the stator.

Motors are known in which the electrodes of the stator constitute a plurality of vanes relatively offset in the axial direction and between which move the vane-shaped electrodes of the rotor, wherein the rotor is of bipolar construction. Despite their very simple construction, these motors have not been used in practice hitherto, because they provide a relatively low torque when compared with electromagnetic motors of equivalent size.

According to the invention, the active surface of the electrodes of an electrostatic motor extends longitudinally in the axial direction of the rotor shaft and laterally in the direction of rotation; wherein, the lateral dimension, width, of the electrodes is from 5 to 100 times the size of the air gap between opposing stator and rotor electrodes. Thus, the active surfaces can be enlarged by lengthening the rotor. In order to obtain the maximum power, the capacitance variation between rotor and stator electrodes as a function of the angle of rotation of the rotor should be as sinusoidal as possible. If the width of the electrodes is smaller than 5 times the size of the air gap, this sinusoidal form is lost due to marginal effects. If the width of the electrodes is more than 100 times the size of the air gap, the capacitance variation has a substantially triangular course. In this case, the odd harmonics components of the energizing potential do not contribute to the power output of the motor.

The torque output of the motor may be increased by increasing the number of electrodes. While speed of the motor decreases with an increase in the number of electrodes, in many cases this result is desirable because need for a speed reduction transmission is dispensed with.

In one embodiment of the motor according to the invention, the electrodes of the stator are located on a plurality of cylindrical surfaces concentrically arranged with respect to the rotor shaft. The electrodes on the rotor are also disposed on a plurality of cylindrical surfaces concentrically arranged around the rotor shaft. The surfaces containing the stator electrodes and the rotor electrodes are located in alternating concentric rows.

In another embodiment of a motor according to the invention, the stator and the rotor consist of a disc of insulating material having a low dielectric constant, preferably lower than 2, on which at least one ring of insulating material is positioned. The ring has the electrodes disposed thereon. The insulating material provides a decreased mass for the rotor, thereby decreasing the inertia of the rotor and permitting the motor to start more readily.

In another embodiment of a motor according to the invention, the stator consists of a hollow cylinder on the inner side of which are provided axially extending electrodes, while the rotor consists of a cylinder which may be hollow and which is provided on its outer side with axially extending electrodes. The height of the electrodes is preferably greater than the air gap.

Figure 2:
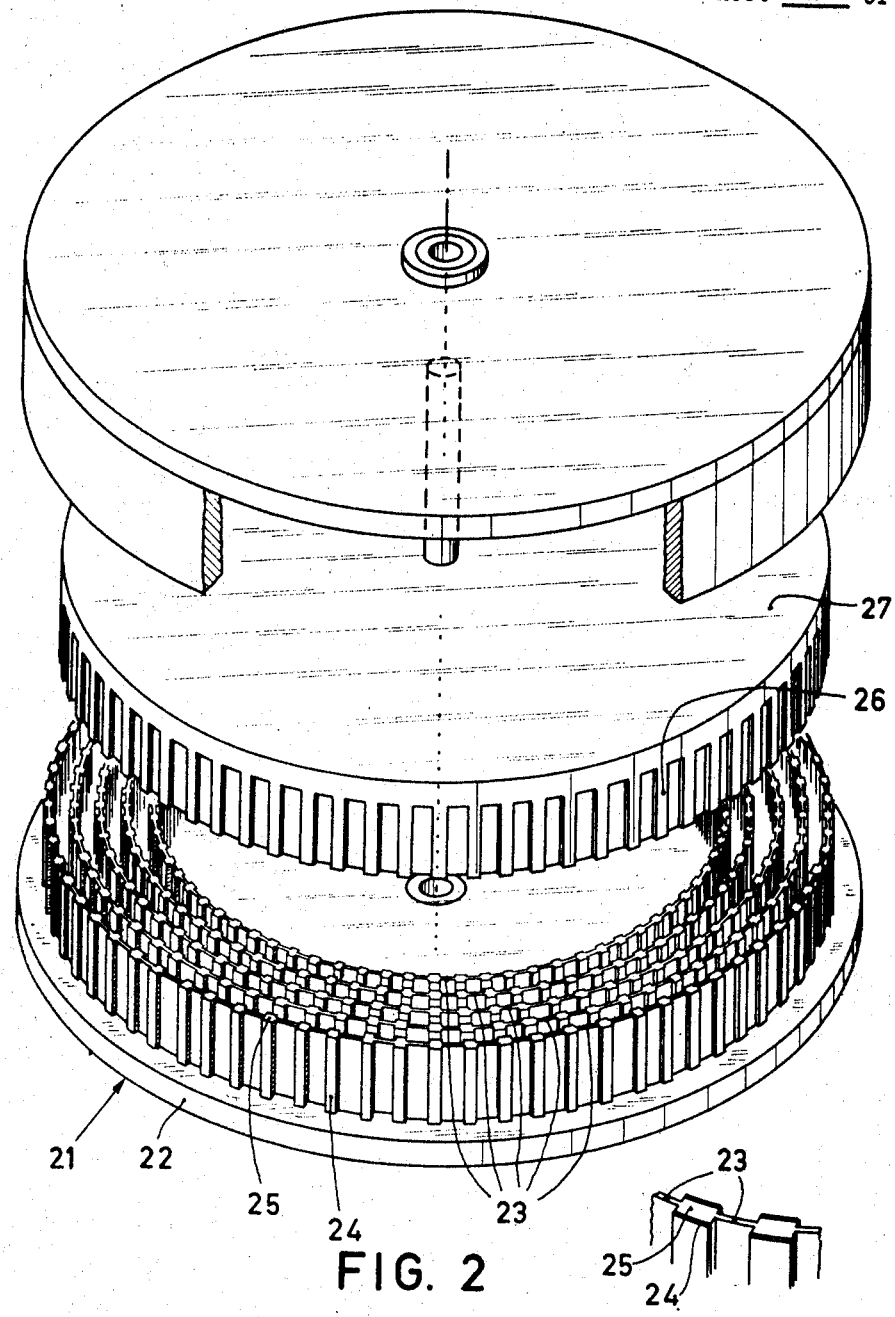
Figure 3:
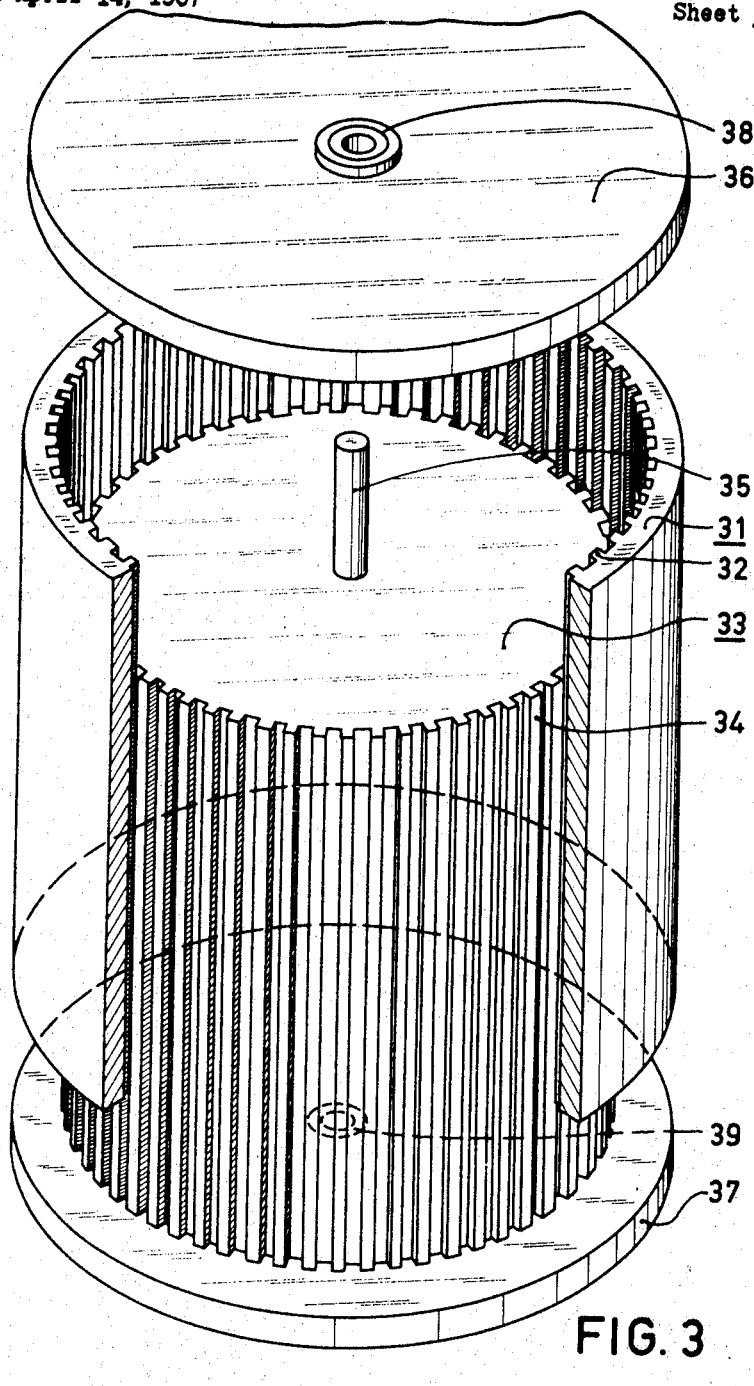

The invention will now be described more fully with reference to the following figures, of which:

FIG. 1 shows a motor according to the invention in which the tooth-shaped electrodes of the stator and the rotor are provided on a metal disc, FIG. 2 shows such a motor having an insulated disc portion included on the stator and the rotor, FIG. 3 shows a motor in which the stator and the rotor are cylindrical elements.

In FIG. 1, the stator 1 consists of a disc 2 at right angles to which extend freely supported tooth-shaped electrodes 3. It has been found that dimensioning the electrode width, measured in the direction of rotation, within the range of 0.2 to 0.7 and preferably 0.45 times the pitch of the electrodes, a maximum capacitance variation is obtained between the electrodes of the stator and the rotor which results in a maximum torque. In the embodiment of FIG. 1 the width of each stator electrode 3 is approximately 20 times the size of the air gap, the radial distance between a stator electrode 3 and a corresponding rotor electrode 6, and 0.45 times the pitch of the stator electrodes. The stator electrodes 3 are equally spaced in circular rows concentric with the rotor shaft 5. When the number of circular rows of electrodes is increased, the torque produced by the motor gradually increases. The number of electrodes per circular row of the stator 1 is preferably larger than 12 so that the speed is lower than 500 r.p.m. at a frequency of the supply voltage of 50 c./s. With a large number of electrodes, the air friction between the electrodes 3 of the stator 1 and the electrodes 6 of the rotor 7 cooperating with the stator is small. The electrodes 6 of the rotor 7 are also disposed in circular rows concentrically positioned on the rotor shaft 5 and have substantially the same width as the cooperating stator electrodes 3. The rotor electrodes 6 extend at right angles to the disc 9. The rotor 7 rotates about the axis of rotor shaft 10 which is centrally disposed with respect to the disc 9. This shaft 10 is journalled at one end in a bearing 11 of electrical insulating material which is located in a cover disc 13. The cover disc 13 is held in fixed spaced relation from the stator 3 by means of an insulating spacer ring 14. The tooth-shaped stator electrodes 3 are integral with the disc 2 and the tooth-shaped rotor electrodes 6 are integral with the disc 9 such that both the stator 1 and the rotor 7 can be fabricated by extrusion or by injection-moulding of a suitable metal. Alternately, the stator 1 and the rotor 7 may be manufactured by pressing or injection-moulding an insulating material having a low dielectric constant, preferably lower than 2, after which the disc and tooth-shaped electrodes have a conductive metal vapor deposited thereon. The use of synthetic resins as the insulating material has the advantage that the rotor has a lower inertia due to the decreased mass of these materials. The rows of rotor electrodes are rotatably interposed with respect to the rows of the stator electrodes.

In FIG. 2, the stator 21 comprises a disc 22 of insulating material having a low dielectric constant on which are provided electrodes 24. The rotor 27 is of similar construction. The air gap between the electrode core portion 25 of the stator 21 and the core portion of electrode 26 of the rotor 27 cooperating with the stator is a least three times the active air gap. That is, the tooth-shaped electrodes of the stator and rotor have an inner core of insulating material and an outer coating of electrically conductive material; wherein, the air gap between the confrontation core surfaces is at least three times the air gap between the confronting conductive coating surfaces. The coatings 24 are applied by vapor deposition, stamping or bonding and, when vapor-deposited, the electrodes may constitute an uninterrupted assembly. The rows of electrodes of the rotor 27 are rotatably interposed with the rows of electrodes 21 of the stator.

In FIG. 3, the stator 31 consists of a hollow cylinder the inner side of which is provided with axially extending tooth-shaped electrodes 32, the height of the electrodes being greater than the air gap. The rotor 33 comprises a cylinder provided with axially extending tooth-shaped electrodes 34, the height of which is also greater than the air gap. Both the stator 31 and the rotor 33 may be manufactured in a simple manner from metals or synthetic resinous materials wherein these materials are extruded to form a rod from which the stators and rotors can be cut. The rotor has a shaft 35 adapted to rotate in bearings 38 and 39 provided in covers 36 and 37. In case the stator and/or the rotor is or are manufacutred from synthetic resin, the conductive coating on the electrodes may be applied by vapor deposition, stamping or bonding. It should be noted that the respective electrodes of the stator 31 are electrically interconnected as are the electrodes of the rotor 33. In the vapor-deposition fabrication method, this is achieved automatically by not covering the space between the teeth.

In the motors described, the voltage is supplied to the rotor through a sliding contact on the rotor shaft and to the stator through a direct connection to the interconnected electrodes. In case the rotor is manufactured from an insulating material, it should be ensured that the interconnected electrodes are electrically connected to the rotor shaft.

The above cited embodiments are intended as exemplary only, and while I have described my invention with a specific application and embodiment thereof, other modifications will be apparent to those skilled in the art without departing from the spirit and scope of the invention as defined by the appended claims.

What is claimed is:

1. An electrostatic synchronous motor comprising rotor shaft means; stator means in concentrically positioned relation with said rotor shaft, said stator means having a plurality of electrodes parallel to said rotor shaft and positioned in at least one circular row thereon; rotor means insulated from said stator means concentrically positioned with said rotor shaft, said rotor means including a plurality of electrodes positioned in at least one circular row thereon, and supply voltage means in conductive relation to said rotor means and said stator means; wherein said rows of stator and rotor electrodes are positioned in concentric adjacent spaced relationship and define an air gap therebetween, and the width of said stator and rotor electrodes is 5 to 100 times as great as the radial dimension of said air gap.

2. An electrostatic synchronous motor according to claim 1 wherein the number of electrodes on said rotor means and said stator means is greater than twelve.

3. An electrostatic synchronous motor according to claim 1 wherein said width of each of said rotor and stator electrodes is from 0.2 to 0.7 times the pitch of said electrodes.

4. An electrostatic synchronous motor according to claim 1 wherein said electrodes on said stator means and said rotor means are positioned on at least one cylindrical surface.

5. An electrostatic synchronous motor according to claim 1 wherein the stator means and the rotor means comprise a disc having tooth-shaped electrodes attached normally thereto.

6. An electrostatic synchronous motor according to claim 1 wherein said stator means comprises a hollow cylinder having said electrodes axially positioned on the inner diametral surface of said hollow cylinder and said rotor means comprises a cylindrical member having said electrodes axially positioned on the outer diametral surface.

7. An electrostatic synchronous motor according to claim 1 wherein the stator disc means and the rotor disc means are of insulating material having a low dielectric constant, and the tooth-shaped electrodes of said stator means and said rotor means comprise an inner core of insulating material having a relatively low dielectric constant and a surface coating of electrically conductive material wherein the air gap between the confronting surfaces of said stator and of said rotor electrode cores is at least three times the air gap between the adjacent confronting surfaces of said stator and rotor conductive coatings.

8. An electrostatic synchronous motor comprising rotor shaft means; stator means in concentric relation with said rotor shaft, said stator means including a disc element and at least twelve electrodes equally spaced in a circle on one surface of said disc element with each of said electrodes being normally aligned with said disc surface; rotor means electrically insulated from said stator means and in concentric relation with said rotor shaft, said motor means including a disc element and at least twelve electrodes equally spaced in a circle on one surface of said disc element with each of said electrodes being normally aligned with said disc surface; wherein said rows of said stator and said rotor electrodes are positioned in confronting spaced relationship and define an air gap therebetween and the width of said stator and rotor electrodes is 5 to 100 times as great as the radial dimension of said air gap.

9. An electrostatic synchronous motor according to claim 8 wherein said at least one row of electrodes on each of said stator means and said rotor means are each positioned on at least one cylindrical surface.

10. An electrostatic synchronous motor according to claim 8 wherein said width of said rotor and stator electrodes is from 0.2 to 0.7 times the pitch of said electrodes.

11. An electrostatic synchronous motor according to claim 8 wherein the stator means and the rotor disc means are of insulating material having a low dielectric constant, and the tooth-shaped electrodes of said stator means and said rotor means comprise an inner core of insulating material having a relatively low dielectric constant and a surface coating of electrically conductive material; wherein the air gap between the confronting stator and rotor electrode cores is at least three times the air gap between the adjacent confronting surfaces of said stator and said rotor conductive coatings.

References Cited

UNITED STATES PATENTS

| 735,621 | 8/1903 | Thomson | 310—5 |
| 1,974,483 | 9/1934 | Brown | 310—5 |
| 2,232,143 | 2/1941 | Schweitzer | 310—5 |
| 3,297,888 | 1/1967 | Zwolski | 310—6 |

MILTON O. HIRSHFIELD, *Primary Examiner.*

D. F. DUGGAN, *Assistant Examiner.*

U.S. Cl. X.R.

318—116